US008430733B2

(12) United States Patent
Chang et al.

(10) Patent No.: US 8,430,733 B2
(45) Date of Patent: Apr. 30, 2013

(54) SKILL BASED GAMES OF CHANCE

(75) Inventors: Christopher Chang, Henderson, NV (US); Steven Byrne, Las Vegas, NV (US); Katrina Lane, Henderson, NV (US); Thomas Rassweiler, New York, NY (US); Kenny Rosenblatt, New York, NY (US)

(73) Assignee: Caesars Entertainment Operating Company, Inc., Las Vegas, NV (US)

( * ) Notice: Subject to any disclaimer, the term of this patent is extended or adjusted under 35 U.S.C. 154(b) by 0 days.

(21) Appl. No.: 13/248,445

(22) Filed: Sep. 29, 2011

(65) Prior Publication Data

US 2013/0084930 A1 Apr. 4, 2013

(51) Int. Cl.
*G06F 17/00* (2006.01)

(52) U.S. Cl.
USPC .......................................................... 463/11

(58) Field of Classification Search .............. 463/11-13, 463/16; 273/244.2
See application file for complete search history.

(56) References Cited

U.S. PATENT DOCUMENTS

| | | | | |
|---|---|---|---|---|
| 6,749,500 | B1 * | 6/2004 | Nelson et al. | 463/13 |
| 6,932,706 | B1 | 8/2005 | Kaminkow | |
| 6,960,134 | B2 | 11/2005 | Hartl et al. | |
| 7,264,545 | B2 * | 9/2007 | Maya et al. | 463/16 |
| 8,241,100 | B2 * | 8/2012 | Katz et al. | 463/16 |
| 2001/0019293 | A1 * | 9/2001 | Kose et al. | 331/99 |
| 2006/0249904 | A1 | 11/2006 | Matheson et al. | |
| 2009/0082079 | A1 * | 3/2009 | Kuhn et al. | 463/13 |
| 2009/0253503 | A1 * | 10/2009 | Krise et al. | 463/31 |
| 2011/0159944 | A1 | 6/2011 | Jones et al. | |
| 2012/0264495 | A1 * | 10/2012 | Amaitis et al. | 463/10 |

FOREIGN PATENT DOCUMENTS

KR 10-2005-0020842 3/2005

OTHER PUBLICATIONS

PCT International Search Report and Written Opinion, PCT Application No. PCT/US2012/052912, Feb. 20, 2012, nine pages.

* cited by examiner

*Primary Examiner* — Ronald Laneau
(74) *Attorney, Agent, or Firm* — Fenwick & West LLP

(57) ABSTRACT

Described are casino games that incorporate a player's physical dexterity into gameplay, thus adding a physical skill component to a game, beyond any mental skill components the underlying games already posses. Similarly to the manner in which a player's knowledge of a game's rules and strategies allows the player to increase their chance of winning traditional casino games, the dexterity, or skill based games allow the player to increase their chance of winning by performing game-oriented physical tasks. Examples of games with this feature are a poker game where a player shoots a game gun at a display device to add cards to their hand in hopes of forming a winning hand, and a three dimensional mahjong game where a player rotates a tile structure to find and removing matching tiles in order to increase their score.

22 Claims, 7 Drawing Sheets

| | Bet 1 (7 shots) | Bet 2 (6 shots) | Bet 3 (5 shots) |
|---|---|---|---|
| Royal Flush | 250 | 550 | 900 |
| Straight Flush | 50 | 125 | 200 |
| Four of a Kind | 25 | 65 | 100 |
| Full House | 9 | 20 | 40 |
| Flush | 6 | 14 | 25 |
| Straight | 4 | 9 | 15 |
| Three of a Kind | 3 | 7 | 12 |
| Two Pair | 2 | 5 | 8 |
| Jacks | 1 | 3 | 5 |

SKILL BASED GAMES OF CHANCE

FIELD OF ART

The present invention relates to casino-based games of chance, and more particularly to casino-based games of chance incorporating player dexterity into the outcome of the game.

BACKGROUND

Games in casinos are largely mental exercises. Although some amount of physical action, such as rolling the dice in craps, makes the game more interactive and exciting, the physical action does not alter the odds or outcome of the game in any controllable sense. For example, although the player may throw the dice in craps, the player's ability to throw the dice does not have any impact on the outcome of the roll, which is purely random outcome due to the mechanics of the dice and the craps table. Another example is a slot machine. Regardless of how the player initiates a spin, the outcome of the game is determined by the predetermined odds of the game, not by the manner in which the slot machine handle is pulled. Knowing the chance of winning in advance is attractive for many casino game players. Players can maximize their chances of winning by learning the rules of the game and by placing their bets according to a strategy.

In more complex games, players do more than simply place their bets and initiate the game. For example, in Blackjack, the player often has the option of "staying" with their current cards or "hitting" for an additional card at the risk of "busting." Even in more interactive games, however, the player's interaction is limited to making decisions, and once those decisions are made, the game moves forward assuming the success of those decisions. Using the example of Blackjack above, if a player decides to "hit" and take an extra card, the dealer is then required to give the player the extra card as determined by the rules of the game. There is no chance that the actions the player wishes to take with regard to gameplay will actually fail to occur.

SUMMARY

Described are casino games that incorporate a player's physical dexterity into gameplay, thus adding a physical skill component to a game, beyond any mental skill components the underlying games already posses. Similarly to the manner in which a player's knowledge of a game's rules and strategies allows the player to increase their chance of winning traditional casino games, the dexterity, or skill based games allow the player to increase their chance of winning by performing game-oriented physical tasks.

One example embodiment is a video poker game where a player acquires cards for their hand by shooting cards that appear on a display device with a game gun. If the player successfully hits a card with a shot from the game gun, the card is added to the player's hand. The game incorporates the player's mental knowledge of poker strategy with their dexterity at using the gun to acquire the cards they want for their hand. The cards on the display device move around the display device to make it difficult for the player to acquire the cards. Specific embodiments vary how the cards move on the display device, and the poker rules used in the game can be varied to incorporate different poker game types.

Another example embodiment is a video mahjong game where a player rotates a three-dimensional tile structure to match and remove tiles containing the same symbol. Matching tiles may be located on different sides of the structure such that the player may need to rotate the tile structure to find matching tiles. The player's game time is limited, so the more fluidly the player can control the rotation of the structure, the more matches they will be able to make before the game time expires. By matching and removing tiles, the player is able to reveal other tiles which they can use to match with other exposed tiles.

The features and advantages described in this summary and the following detailed description are not limiting. Many additional features and advantages will be apparent to one of ordinary skill in the art in view of the drawings, specification, and claims hereof.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Shooting Video Poker

A first example of a casino game incorporating player dexterity is a video poker game where a player acquires cards for their hand by shooting cards on a display device with a game gun. The display device is located on a gaming machine, in a casino location. The purpose of the game for the player is to acquire cards to form a winning poker hand. As opposed to traditional poker where cards are freely received once play begins and the manner in which the player acquires the cards is not relevant to the game outcome, or a player must bet for additional cards received, in this game the player must acquire cards for their hand by using a specific physical skill requiring dexterity-shooting a game gun at cards moving across a display device. The game is implemented a combination of hardware (e.g., processor, logic circuits, memory, network interfaces, etc.) and programming instructions stored in non-transitory computer memory, and executed by the processor.

Figure 1:
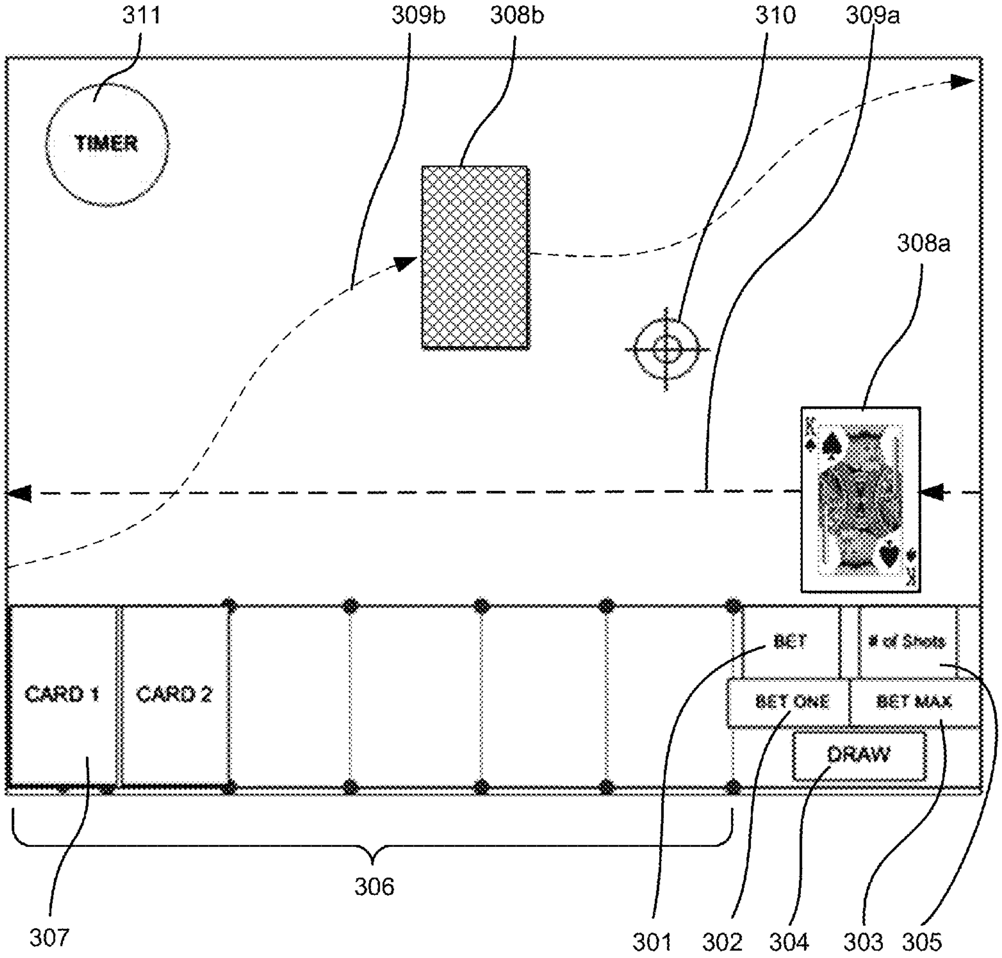
FIG. 1 illustrates a screen shot of a skill based video poker game during game play, according to one embodiment.

FIG. 1 illustrates a screen shot of a skill based video poker game during game play, according to one embodiment. A poker game (or "hand") begins when the game receives a player bet 301 and when the game receives a "draw" button 304 press from the player indicating that the hand should begin.

A player may place a bet if they have inserted credits into the gaming machine. Credits may be inserted into the gaming machine manually, or they may be automatically withdrawn from a player credit account. The player may link their player credit account through a player tracking card that has been swiped through the gaming machine prior to play. The player's available credits for gameplay are displayed on the display device of the gaming machine (not shown).

A player places a bet by pressing a bet button such as bet buttons 302 or 303. After the bet is placed, the bet amount 301 is shown on the display device of the gaming machine. In implementations of the game where bets occur in fixed amounts, the game may begin only when the player has selected a bet of the proper increment. In one example, the player is provided with at least two betting options. A "bet one" button 302 increases the player's bet in increments of one credit or one "unit." For example, the gaming machine may be configured to only receive bets in units of 5 credits at a time, so in this example pressing the "bet one" button 302 may increase the player's bet by 5 credits. A "bet max" button 303 increases the player's bet to the maximum amount allowed by the gaming machine. Different gaming machines may have different maximum bet amounts to target different market segments of players. For example, a low bet cap, for example $5 in credits maximum per hand, may target more risk-averse players, whereas a high bet cap, for example $50 in credits maximum per hand, may target more risk-taking players.

Once a bet has been placed and the player presses the "draw" button 304, game play begins. At the start of game play, the game grants the player a number of shots, where the number of shots 305 is displayed on the display device of the gaming machine. The shots 305 represents the number of attempts the player may make to shoot cards that appear on the display device to add the cards to their hand 306. The more shots that are offered, the more chances a player is given to form a winning hand. The number of shots provided may vary.

The number of shots 305 dispensed for gameplay may be based on the bet 301 received from the player. In one version of the game, the more the player bets, the more shots they get. For example, in a poker game based on a five card hand, the player may buy 5, 6, or 7 shots. A player buying only 5 shots get the best odds of winning, but can only win a limited amount because they have provided the smallest bet. A player buying 6 shots gets slightly lower payout odds, but can win more because they have provided an intermediate level bet. A player buying 7 shots gets the lowest payout odds, but can win the most because they have provided the largest bet possible. The payout odds for the game can be varied by changing the difficulty of the game, both with respect to the cards provided to the player and the dexterity required to shoot the cards and add them to the players hand.

In a different version of a poker game based on a five card hand, the player may also buy 7, 6, or 5 shots, however in this case 7 shots are provided for the smallest bet and 5 shots are provided for the largest bet. In this case, the smallest bet again has the highest payout odds, and pays out the smallest amount when the player wins. The payout odds are higher for the 7 shot case at least in part because the player has the most opportunities to shoot cards to add them to their hand. The largest bet has the smallest payout odds, and pays out the most when the player wins. The payout odds are lower for the 5 shot case at least in part because the player has the most opportunities to shoot cards to add them to their hand.

Alternatively, the number of shots 305 dispensed for gameplay is a fixed number independent of the amount bet.

A time limit 311 displayed on the display device during gameplay. The time limit 311 is the time within which the player must use their allotted shots before gameplay ends.

Any shots left unused when the time limit 311 expires are forfeited. The time allotted may be based on the amount bet, with more time allotted for a larger bet. For example, the player may get 30 seconds for a one unit bet, 45 seconds for a two unit bet, and 60 seconds for a three unit bet. Alternatively, the time limit may be independent of the amount bet. In another case, the time limit 311 represents the amount of time a player is granted to use each shot, rather than the total time allotted for all shots. As opposed to paying for a given number of shots, the player may alternatively pay for the game by where the bet is used to buy time to play the game. In this case, there is a separate control button that the player selects to determine the time limit, and the button determines both the time per shot and the paytable.

In some versions of the game, at the start of the game the player's hand may include one or more "free" cards that the player does not have to shoot to earn.

During gameplay, the player shoots a game gun (not shown) at the display device of the gaming machine to add cards to their hand 306. The game machine detects the input from the game gun, and generates a shot input signal in response thereto. The shot input includes a shot location, which indicates the location on the display device where the player has pointed the game gun.

One example technology for implementing the game gun involves using an electromagnetic radiation signal from the gun is used to determine where the player has pointed the gun and fired a shot. In one case, the signal is received at the display device, and processing is done to determine the shot location based on the received radiation. Alternatively, the radiation signal is reflected from the display device back at the game gun, and the reflected signal is processed to determine the shot location. To facilitate the player's ability to track the direction where the game gun is pointing at the display device, a target 310 may be displayed on the display device, indicating where the game gun is pointing.

During gameplay, the game displays cards 308 on the display device, which may potentially be added to the players hand 306. If the shot location matches the location of a card displayed on the display device, the card 308 may be added to the player's hand, depending on the game operation as described below. Each card 308 takes up a defined space on the display device, dictated by the boundaries of the card 308 on the display device. A shot location is be considered to match the card location if the shot location falls within the boundaries of the card 308 on the display device. Preferably, each card includes a bull's-eye (not shown), within the card boundaries. In this case, a shot location is considered to match the card location if the shot location falls within the boundary of the bull's-eye.

In one version of the game, the card is automatically added to the player's hand 306 if the shot location matches the card's location. In a different version of the game, if the card location matches the shot location, there is a selection process is used to decide whether that the card will be added to the player's hand 306. For example, the selection process may use a 50% probability for including the card in the player's hand. Alternatively, the selection process for whether the card will be added to the player's hand 306 may be based on different factors, for example, the amount bet, the suit and number of the card, the player's current hand, the number of shots the player has remaining, and/or the amount of time remaining.

Figure 2:
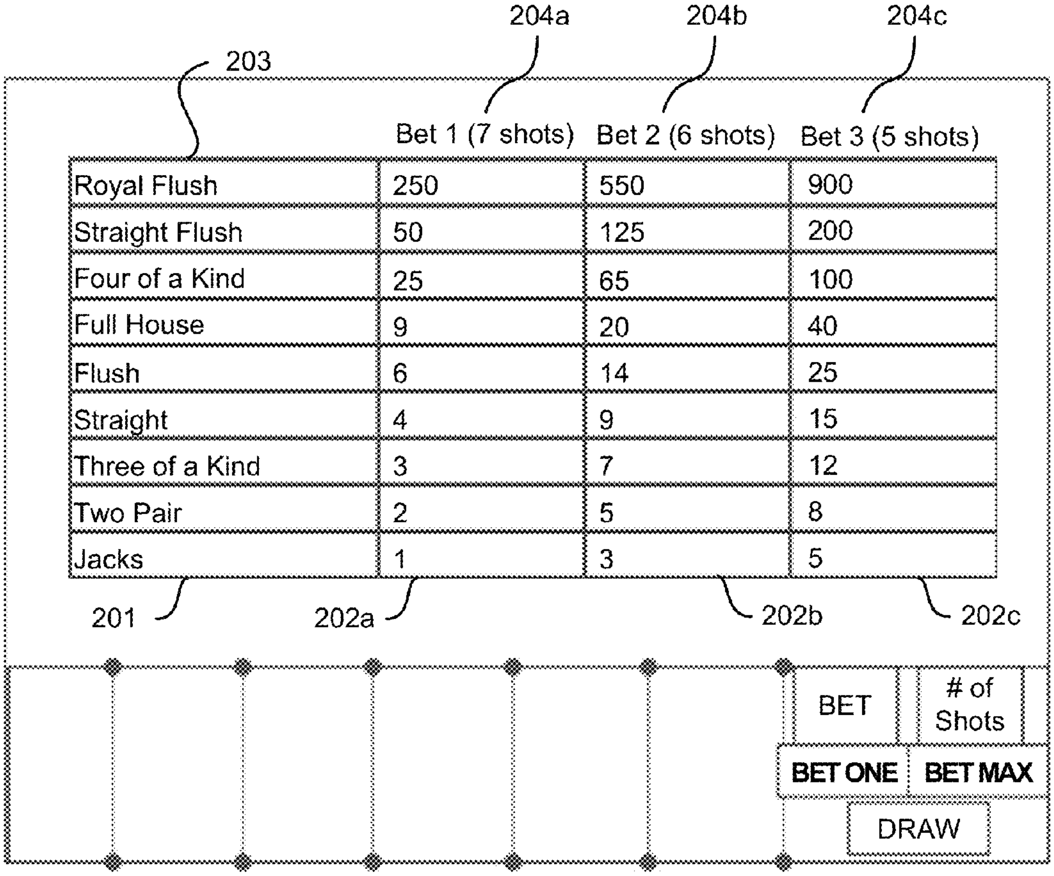
FIG. 2 illustrates a screen shot of a skill based video poker game pay table, according to one embodiment.

Each card 308 that appears on the display device has a path of travel 309; the path of travel is illustrated here for purposes of explanation only, and is not displayed to the player. The path of travel may vary for each card, or may repeat for multiple cards. More than one card 308 may be displayed on the display device a single time. FIG. 2 illustrates two cards 308*a* and 308*b* taking different paths of travel 309*a*, 309*b* about the display device during gameplay. The path of travel 309 includes information about the location of the card as a function of time, such that the card 308 moves about the display device. The position over time information associated with the path of travel 309 includes information about the velocity and acceleration of the card 308 as it moves about the display device. The path of travel 309 makes shooting cards 308 to add them to the player's hand 306 a non-trivial dexterity-type challenge that requires hand-eye coordination on the part of the player to succeed. Thus, the player's physical skill at aiming the game gun and timing the firing of the gun directly impacts the selection of cards in the player's hand, and thus the outcome of the game.

The path of travel 309 includes linear or another more complex translational motion. The path of travel 309 includes a start point and an endpoint. There are two methods of determining the path of travel for a card. First, the path of travel 309 may be dynamically assigned to each card. For example, paths of travel 309 may be using a random motion function with smoothing. Second, there may be a fixed subset of paths 309 the cards 308 may take, and the path for a particular card is selected from the subset, without replacement. For example, the fixed subset may comprise 100 predefined paths 309, and for each card 308, one of these predefined paths is selected and used.

The path 309 chosen or created for a given card 309 may be determined based on the amount bet, such that the more the player wagers, the more complex the path of travel becomes, thereby making it harder for the player to shoot the cards 308, but with the upside being a bigger potential payout for a winning hand. The path 309 may also be determined based on the suit and number on the card, such that higher "value" cards such as an ace, king, or card that the player already has in their hand travels a more complex path than a lower value card, such as a 2 or a 3, or a card the player does not already have in their hand.

The complexity of the path 309 can be measured by the total degrees of curvature along the path from the start to end point, and the speed or acceleration of the card as it travels along the path. Paths 309 may be increased in complexity by changing the velocity or acceleration of the card as it travels along the path 309. Generally, higher value cards (e.g., kings and aces) will have more complex paths than lower values cards (e.g., twos and threes). Thus, greater physical skill and dexterity is required for the player to acquire the higher valued card for their hand. The chosen path of travel 309 may be time-limit 311 based, such that early on in gameplay, cards 308 have less complex paths of travel 309, but as gameplay progresses, the paths of travel 309 increase in complexity.

The path of travel 309 also includes a duration of travel, indicating the amount of time a given card 308 is displayed on the display device. By adding and removing cards 308 from the display device over different time periods, the player must choose whether to shoot at the cards which are currently available, or wait for other cards which may provide them with a better hand 306. This adds a degree of strategy to the game as the player must judiciously choose which cards to shoot at. This challenge is heightened by the timer 311, which is shown counting down.

The path of travel 309 may also include a rotation behavior for the cards. Rotation behavior includes reorienting the card 308 on the display device such that it appears horizontally, vertically, or at any angle in the plane formed by the display device. Adding rotation to the path of travel 309 of the card increases the difficulty of shooting the card. The faster the card rotates, or changes direction of rotation, the more difficult the card is to shoot as the valid area for hitting the card changes more rapidly than it would be by translational motion alone.

The path of travel 309 may also includes a flip behavior (i.e., rotation out of the plane of the display device). Flip behavior indicates, for each point along the path of travel 309, whether a card 308 on the display device displays the back of the card or the front of the card. The back of the card, as exemplified by card 308*b*, provides no information to the player regarding which card it is. The front of the card, as exemplified by card 308*a*, tells the player exactly what card 308*a* it is, in this case the king of spades. This allows a player to wait to try and find out what each card is by shooting it. However, waiting to shoot at cards 308 may prevent the player from forming a winning hand if the time limit 311 expires.

Flip behavior includes a speed at which the card 308 flips from one side to another, the number of times the card 308 flips during its time on the display device, and the amount of time the card spends displaying a side to the user. The speed with which a card flips over may be chosen randomly from a group of possible speeds, for example, the group of speeds may include a turnover speed of one second to turn between front and back, up to five seconds to turn between front and back. Similarly, the number of flips the card goes through while present on the screen may also be randomly selected from a group, for example cards may flip anywhere from once per path of travel 309, to five times 309 per path of travel. Similarly, the amount of time a card spends face up or face down may be selected randomly from a group, for example cards may stay on one side anywhere from one second to ten seconds.

Alternatively, the flip behavior, including the speed at which a card flips, the number of times a card flips, or the time spent on each side, may be determined based on the amount bet 301, the type of card 308, the player's hand 306, and/or the time left in the game.

The game may be made more difficult by always or preferentially showing the back of the card, flipping the card more quickly, and/or only displaying the front of the card for a short amount of time. The game is more difficult in these instances because the player has less time to react upon the knowledge of the card type and number before they must decide whether to shoot it, and then physically manipulate the game gun to accurately aim and shoot at the card to add it to their hand. The game may be made easier by preferentially or always showing the front of the card, flipping the card more slowly, and/or only displaying the back of the card for a short amount of time.

The size with which a card 308 appears on the display device may also vary. The size of a card 308 may change throughout its path of travel 309 to give the impression of depth to the player, such that it appears that the card is moving towards or away from the player. The size of a card 308 on the display device may be reduced in order to make it more difficult for the player to shoot the card. Alternatively, the size of a card 308 on the display device may be increased to make it easier for the player to shoot the card.

The game (or a slot data management system coupled thereto) may be configured to monitor the gameplay of the player over multiple rounds of the game to create a history of their shots, choices, bets, and payouts. The game may also maintain historical gameplay information for the player, if the player uses a player tracking card in the gaming machine. The history may be used to dynamically adjust the difficulty of the game for the player. For example, if the history indicates that the player has missed a great deal of shots, won a small percentage of hands, or lost money on the game, the game may adjust its settings to make the game easier in order to encourage the player to continue playing. To make the game easier, the game may tweak the motion, flip, rotation characteristics described above. For example, in order to make the game less difficult, the game may reduce the speed of the provided cards, provide card paths of travel that are more linear with less random motion, decrease the speed and amount of card rotation, increase the amount of time the card spends face up, have less flips total, flip more slowly, and/or increase the size of the cards on the screen.

Alternatively, if the history indicates that the player has hit most of their shots, won a large percentage of their hands, or won a great deal of money on the game, the game may adjust its setting in order to make the game more difficult for the player. To make the game more difficult, the game may tweak the motion, flip, rotation characteristics described above. For example, in order to make the game more difficult, the game may increase the speed of the provided cards, provide card paths of travel that are less linear with more random motion, increase the speed and amount of card rotation, decrease the amount of time the card spends face up, have more flips total, flip more quickly, and/or decrease the size of the cards on the screen.

Some versions of the game permit the player may remove a card 307 from their hand 306 by using a shot on it. Time and shot permitting, this allows the player to replace cards they no longer want in their hand 306 with fresh cards 308 of better perceived value to the player.

The cards 308 displayed on the display device are drawn from a virtual deck of cards. Generally, the virtual deck of cards includes the traditional 52 cards in a standard deck of cards, including 4 suits and 13 cards of each suit. In cases, however, the virtual deck of cards may include a variable number of suits, and a variable number of cards in each suit. In one version of the game, the number of suits in the virtual deck of cards, and or the number of cards in each suit increases as the amount bet increases.

The game supports all variants of poker card games, including straight poker, stud poker, draw poker, community card poker, acey-deucey, three card poker, and pai gow poker. The player's hand may, at the end of the game, contain a variable number of cards depending upon the variant used in the game. For example, the player's hand may comprise 5 cards, 7 cards, or less if the player fails to hit cards with their allotted shots.

FIG. 2 illustrates a video poker game pay table, according to one embodiment. The pay table 203 is viewable by potential players on the display device of the gaming machine, regardless of whether credits have been inserted into the gaming machine. The pay table 203 illustrates the conditions necessary for winning the video poker game. The pay table lists a set of winning player hands 201 which award credit payouts 202 to the player at the end of the game. For reference, the term "hand" may refer to the player's hand, indicating the cards they have collected which may be used to form a winning hand, and may also refer to a single round of the game comprising a bet, a round of gameplay, and a possible credit payout.

Winning hands 201 may include a straight royal flush, a straight flush, four of a kind, a full house, a flush, a straight, three of a kind, two pair, one pair, and/or highest card. The winning hand 201 may entail additional requirements. For example, a pair winning hand may be altered to only pay out if the player's hand has a pair of jacks or better. Certain winning hands may be omitted at the discretion of the casino, for example if a pair of jacks or better is required to win, the high card winning hand will not pay credits to the player at the end of the game.

The credit payout 202 paid to a player depends upon which winning hand they have, and the skill deployed by the player in obtaining the cards for their hand. As shown in FIG. 2, there are three columns 202*a*, 202*b*, 202*c* for payouts, each column 202 corresponding a level of payout based on the skill of the player in terms of the number of shots taken by the player to acquire 5 cards for their hands. In the example paytable of FIG. 2, the player gets the best payout odds but the smallest actual payout for playing with the highest number of shots available (in this example 7) to acquire the cards for their hands. In a poker game based on a five card hand, the player may buy five 204*a*, six 204*b*, or seven 204*c* shots. As described above, a player betting the amount for seven shots 204*a* get the best odds, a player betting the amount for six shots 204*b* gets slightly lower payout odds, and a player betting the amount for five shots 204*c* gets the lowest payout odds. In the example of FIG. 2, the amount of the bet required to "purchase" seven shots for the game is a bet of 1 credit 204*a*. Similarly, the amount of the bet required to purchase six shots is 2 credits 204*b*, and the amount of the bet for five shots is 3 credits.

For example, the straight royal flush listed above pays the most, and the remaining hands pay less in the respective order in which they appear listed above, with high card paying the least. The payout amount for each winning hand may be individually determined by the casino. The credit payout 202 paid to a player will also be based on the amount bet 202*a*, 202*b*, 202*c*. Generally, increasing the amount bet will increase the payout for a winning hand.

Figure 3:
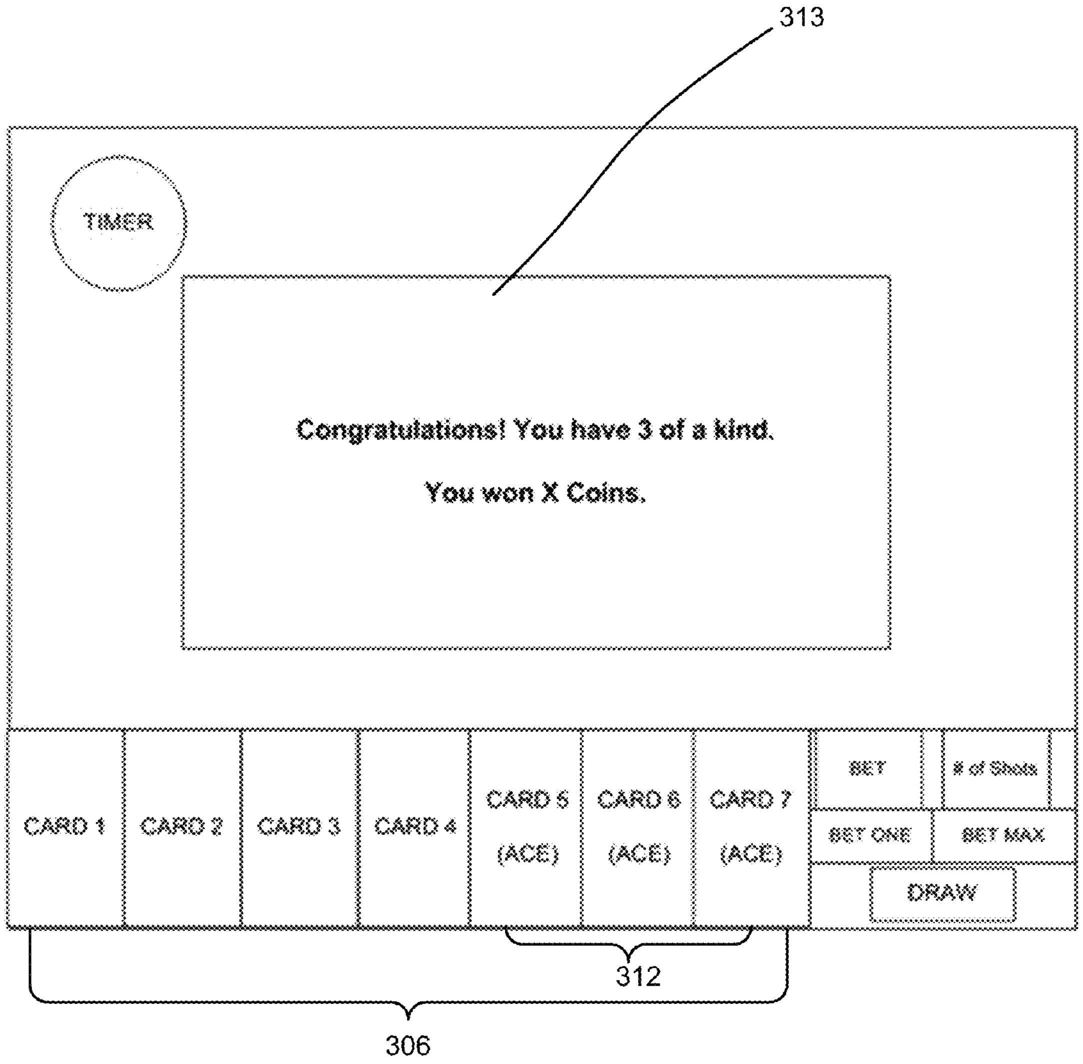
FIG. 3 illustrates a screen shot of the end of a skill based video poker game, according to one embodiment.

Gameplay ends either when the player runs out of shots 305, or when the timer 311 expires. FIG. 3 illustrates a schema for a screen at the end of a skill based video poker game, according to one embodiment. The game processes the player's hand 306 at the end of the game to determine whether the player's hand 306 meets one of the win conditions 201 in the pay table 203. For example. FIG. 3 displays a player's hand 306 that has three aces 312, thereby meeting the win condition 201 for three of a kind.

If the player's hand matches a win condition 201 in the pay table 203, the display device displays the win condition 201 met by the player's hand 213, and the number of credits won by the player 213. The player may then initiate another round of gameplay by placing another bet and pressing the draw button 304.

Spinning Video Mahjong

A second example of a casino game incorporating player dexterity is a mahjong game where a player selects sets of tiles, where each tile in the set has the same symbol on at least one face of the tile. If the symbols match, the tiles (referred to as a set of matching tiles) are removed from the board, increasing their credit award and exposing more tiles that can be removed. The game is played on a display device of a gaming machine, in a casino. The tiles available for selection and removal are displayed on the display device in the form of a structure, which can be rotated in three dimensions. By remembering the locations of bonus block tiles and manipulating the structure, players can remove tiles to increase their credit award and therefore the credits they earn from the game. The game is implemented a combination of hardware (e.g., processor, logic circuits, memory, network interfaces, etc.) and programming instructions stored in non-transitory computer memory, and executed by the processor.

Figure 4:
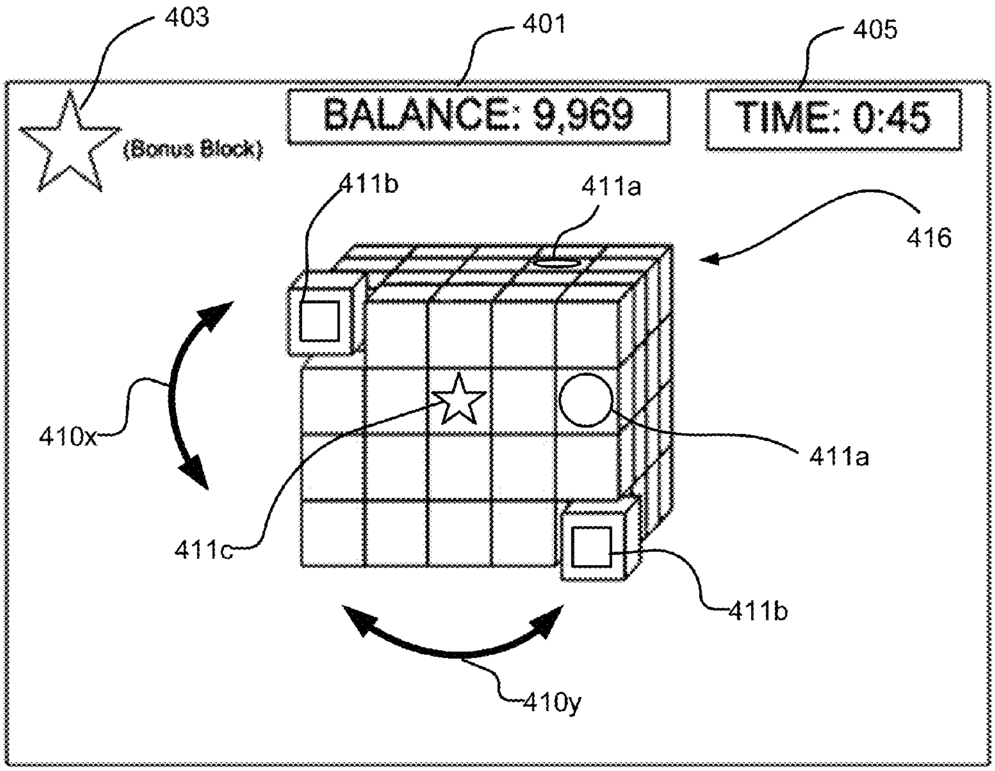
FIG. 4 illustrates a screen shot of a skill based mahjong game during game play, according to one embodiment.
Figure 4:
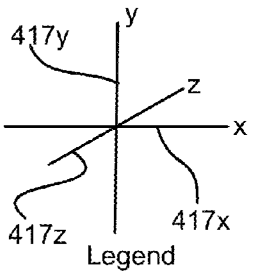
Figure 5:
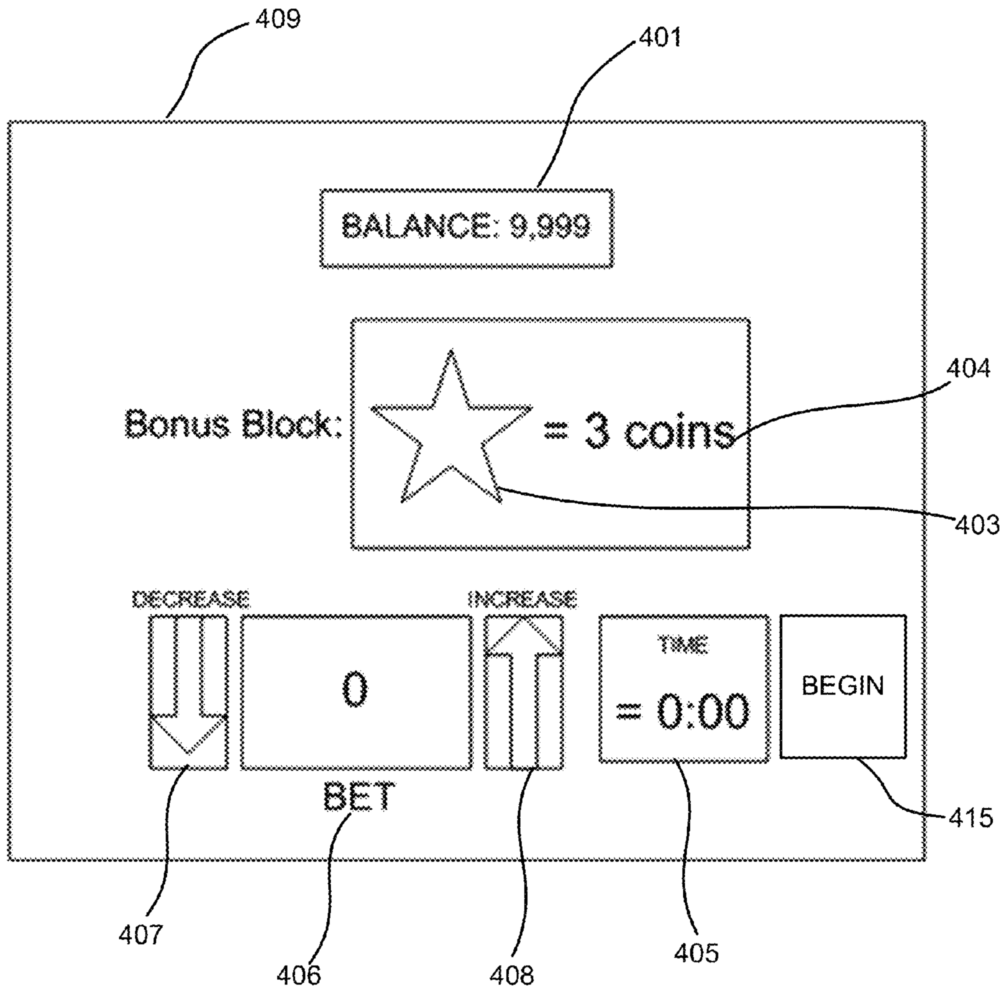
FIG. 5 illustrates a starting screen for a mahjong game, according to one embodiment.

FIG. 4 illustrates a screen of a skill based mahjong game during game play, according to one embodiment. Once the game begins, a timer 405 is provided to the player, starting at the amount time set for the player, and counting down to zero; when the timer reaches zero the game ends. The player's current credit balance 401 is displayed constantly on the display device. As the player completes matching sets of tiles, the credit balance 401 updates in real time to show the player their winnings.

Matching tile sets that have a "bonus block" symbol 403 either reward more credits than other matching sets, or are the only tiles to reward the player with credits, depending upon the version of the game. In the example of FIG. 4, the bonus block symbol of a particular game is a star 403. The bonus block symbol may remain fixed throughout multiple games, or vary from game to game. There may be more than one bonus block symbol per game, and each matching tile set of a given bonus block symbol may award a different number of credits to the player. The bonus block symbols 403 for the current game are displayed on the display device to remind the player which tiles award the player with additional credits.

When the game begins, the game constructs a tile structure 416 including a number of tiles 411. The tile structure 416 appears as a three-dimensional object, in which the tiles 411 that make up the tile structure are themselves substantially rectangular parallelepipeds, e.g., cubes. The tiles are any shape of polyhedron such that the tiles have definable "faces" on which symbols can be applied, and edges so that the tiles can be stacked next to each other. Tiles 411 in the tile structure 416 includes at least one symbol on at least one face of the tile. Each tile may have more than one symbol, either having more than one symbol on a single face of the tile, and/or having a symbol on more than one face of the tile.

In the tile structure 416, the tiles 411 are stacked together such that at any given time some faces of some tiles are exposed to the player, and others are hidden by nature of their being stacked against other tiles. The tile structure may take a familiar shape such as a cube, rectangular parallelepiped, or other geometrical shape. The tiles may also be used to approximate the shape of other polyhedrons, spheres, or other three-dimensional objects. The tile structure may also consist of several layers of tiles, where within each layer the tiles extend out in two dimensions, forming various shapes that are not necessarily repeated by the other layers of the tile structure.

The tile structure 416 is displayed to the player at the start of the game. The game receives rotation input from the player, via a touch input on the display device, or via controls devices on the gaming machine, such as buttons, knobs, dials, joysticks, or the like. The rotation input indicates a direction to rotate the tile structure 416 about an axis so that the player may see other tiles 411 with exposed faces on the tile structure 416. In the example of FIG. 44, the game receives selection input when the player presses one or more rotation arrows 410*x*, 410*y* that are displayed on the display device. The game receives selection input by detecting the motion of the player's finger about the display device in the areas of a rotation arrow 410. The game processes the player's two dimensional motion of their finger on the display device to determine the appropriate axis of rotation 417, and then rotates the tile structure about two principal axes of rotation 417. For example, a player input on rotation arrow 410*x* results in rotation about the x-axis 417*x*, and a player input on rotation arrow 410*y* results in rotation about the y-axis 417*y*. Some versions of the game are further able to process a third type of player rotation input and thereby rotate the tile structure 416 about the third principal axis of rotation, the z-axis 417*z*.

Allowing the tile structure 416 to be rotated and placing matching tiles on different sides of the tile structure 416 increases the dexterity required to succeed at the game, for example by making it more difficult to find tiles 411 with matching symbols that may be on opposite sides of the tile structure 416. For example, the player would not have to do any rotation to match tiles 411*b* with the square bonus block symbol since two of those appear on the exposed side of the tile structure 416. However, without rotation the player might not be able to find a matching tile for the tile 411*c* with the star symbol on it. A matching tile 411*c* with a star on one face may be on the other side of the tile structure 416, or it may be hidden by other tiles in the tile structure 416. Rotation may also assist the player in selecting the two tiles 411*a* with the circle symbol on exposed faces, which is partially obscured in the example in FIG. 4 by the angle at which the tile structure 416 is oriented. The skill requirement is increased if two matching symbols are located on different planes of the tile structure 416 (see, for example, the circle symbol of tiles 411*a*).

The player removes the matching tile sets and adds to their credit balance 401 by selecting tiles 411 that have the same symbol on at least one face. The game generate a selection input in response to the player selection of a tile, for example by the player touching the display device where a tile or tile face is displayed, or by an input on a control device on the gaming machine. In order for two tiles to be eligible for removal, the face of the tile to be matched containing the matching symbol must be exposed as visible to the player, or otherwise not entirely covered by another tile in the tile structure 416.

If the symbol on a first tile 411 matches the symbol on a second tile, the tiles are removed from the tile structure 416, thereby exposing additional tiles that may be possibly be selected and removed. If the symbol on the first tile does not match the symbol of the second tile, both tiles are deselected. In addition to deselection, and additional error notice may be provided to the player to inform them of their mistake. In other versions of the game in order to remove a set of tiles the player must select more than two tiles with matching exposed symbols, for example sets of three tiles or sets of four tiles.

The game implements a set of rules regarding which matching tile sets may be removed by the player, in addition to the requirement regarding matching symbols. In one version, only tiles with at least one "free" edge not touching another tile may be removed, assuming the symbols of the two selected tiles match. In another version, only tiles with at least two free edges not touching another tile may be removed. In yet another version, only tiles with at least two adjacent free edges not touching another tile may be removed. In a fourth version, only tiles with a "left" or "right" free edge not touching another tile may be removed. However, due to the fact that the tile structure 416 may be rotated in at least two, a preferably three dimensions, in this version "left" and "right" are defined by the game with respect to a given axis, and thereby distinguished from "top" and bottom." In order to clarify which tiles are eligible for removal based on their free edges, the left and right free edges of a tile may be colored or may be displayed differently than top and bottom edges.

The game is made more difficult by decreasing the number of matching tile sets which are able to be removed by the player at any given time or by increasing the "distance" between tiles with matching symbols. The distance between matching tiles may be increased by more frequently having a tile with a matching symbol appear on the opposite side of the tile structure 416 from a currently visible tile and symbol. The difficulty may also be increased by increasing the tile "depth,"

or the average number of tiles the player must remove in order to be able to remove the matching tile. The tile depth may be affected by the rules used in a particular version of a game. For example, a version where a tile with any free edge may be removed would mean that more tiles are accessible at any point in time versus a version of the game where a tile may only be removed if a left or right edge is free.

Increasing the tile distance or the tile depth increases the need to rotate the tile structure 416 in order to find matching tiles. The higher the difficulty, the more often the player will have to rotate the tile structure 416 to find the next set of matching tiles. While at lower levels of difficulty, two sets of matching tiles may be immediately apparent without rotating, this circumstance will occur less frequently as the difficulty increases. The more fluid the player is with their movement of the tile structure 416, the more quickly they will be able to find matching tiles, thus increasing their score over the allotted time 405.

After a set of tiles is removed from the tile structure 416, the player's credit balance 401 is updated based on set of tiles removed. For example, if the removed tiles have the bonus block symbol, 403, the player's credit balance 401 may be increased by the amount provided for removing bonus blocks.

In some versions of the games, one of the symbols on the tile may include a "time extender" symbol. If the player removes a set of tiles including the time extender symbol, the time remaining in the game 405 is increased. The amount of the time increase may be a fixed amount, or may be based upon the amount bet by the player, the number of sets of tiles already removed, or the number of sets of bonus block 403 tiles already removed.

The game (or a slot data management system coupled thereto) may be configured to monitor the gameplay of the player, and transmit this information to a patron database, which stores the information in a player account, thereby creating a history of the number of sets of tiles the player removes within an average game time period, and the amount bet for each game. The patron database may also maintain historical gameplay information for the player, if the player uses a player tracking card in the gaming machine. The history may be used to dynamically adjust the difficulty of the game for the player. For example, if the history indicates that the player does not remove many tiles during an average game, or has lost money on the game, the game may adjust its settings in order to encourage the player to continue playing. Alternatively, if the history indicates that the player has removed a large number of tiles during the average game, or won a great deal of money on the game, the game may adjust its setting in order to make the game more difficult for the player.

FIG. 4 illustrates a starting screen 409 for a mahjong game, according to one embodiment. The mahjong game pays credits to the player based on the number of sets of tiles they remove from the tile structure. Different versions of the game may vary in terms of the player is rewarded for matching tiles during the game. Generally, the player will be awarded credits for matching tiles that have the bonus block symbol 403 on at least one face. Some versions will have more than one bonus block 403, where each bonus block 403 may have a different credit payout to the player. Further, some versions may award the player a base amount for every set of tiles they match and remove from the game board.

The starting screen 409 is viewable by all potential players, regardless of whether credits have been inserted into the gaming machine, either manually or through the insertion of a player tracking card. The starting screen 409 illustrates the bonus block 403 symbols for the game, as well as the credit rewards 404 for those symbols.

A player may place a bet if they have inserted credits into the gaming machine. Credits may be inserted into the gaming machine manually, or they may be automatically withdrawn from a player credit account. The player may link their player credit account through a player tracking card that has been swiped through the gaming machine prior to play. The player's available credits for gameplay are displayed on the display device of the gaming machine 401.

The game receives a bet amount 406 from the player before the game begins. The player places a bet by pressing increase 408 or decrease 407 buttons to change the amount of the bet. The player has only a limited amount of time to play the game. In one version of the game, the amount of time 405 given to the player depends upon the amount bet 406. Alternatively, the amount of time 405 given to the player may be fixed independent of the bet. The game begins when the player presses a "begin" button 415.

The amount bet 406 may also determine the number times a bonus block symbol appears in the tile structure 416. The more the player bets, the more a given bonus block symbol will appear in the tile structure. For example, if the player bets 5 credits, this may cause a bonus block symbol to appear between four and eight times in the tile structure. Generally, a bonus block symbol will appear an even number of times, so that each tile containing the symbol has a chance at being removed along with another tile with the same symbol.

The amount bet 406 may be further used to determine the number of different bonus block symbols 403 that are present in the game. For example, if the player bets one credit, there is only a single bonus block symbol 403 (e.g., a star). If the player bets two credits, there are two bonus block symbols 403 (e.g., a star and a circle). If the player bets three credits, there are three bonus block symbols 403 (e.g., a star, a circle, and a square).

Figure 6:
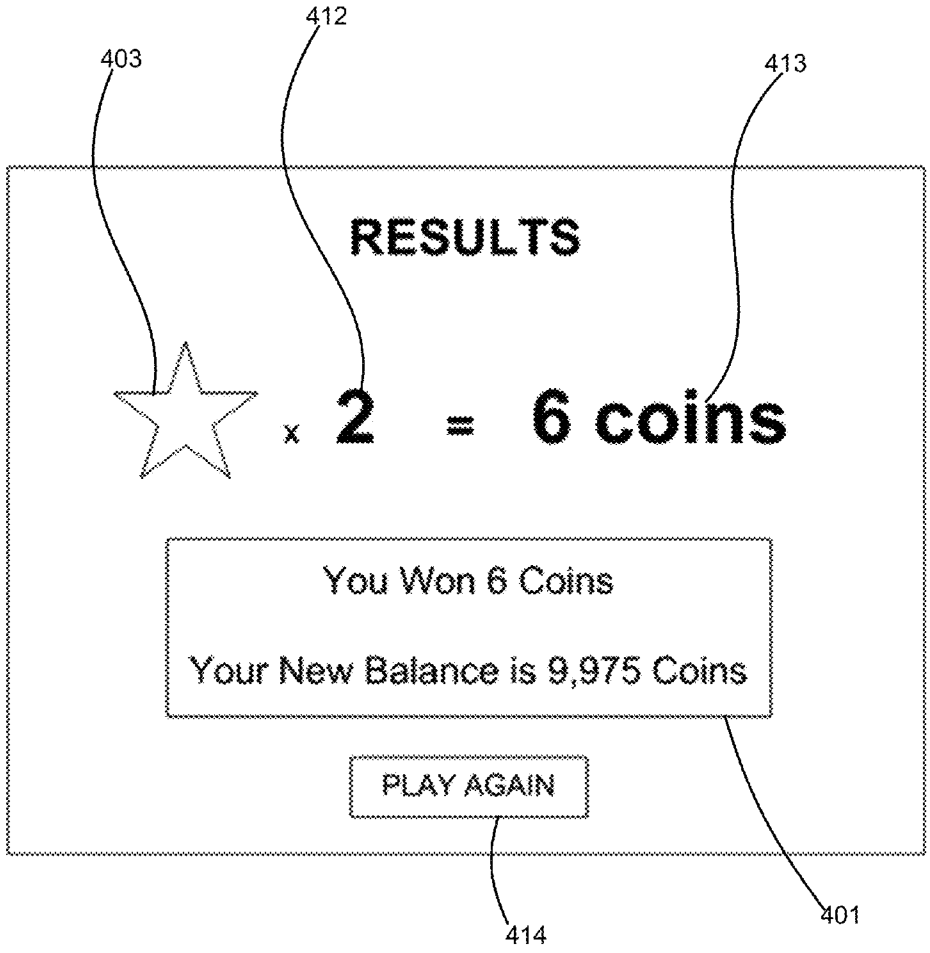
FIG. 6 illustrates a screen shot of the end of a skill based mahjong game, according to one embodiment.

When the game time 405 expires, the game ends. FIG. 6 illustrates a screen for the end of a skill based mahjong game, according to one embodiment. The game tallies the number of sets of bonus block 403 tiles removed 412, and determines an amount of credits 413 to be added to the player's credit total 401. The player is provided with the option of playing again 414.

System Architecture

Figure 7:
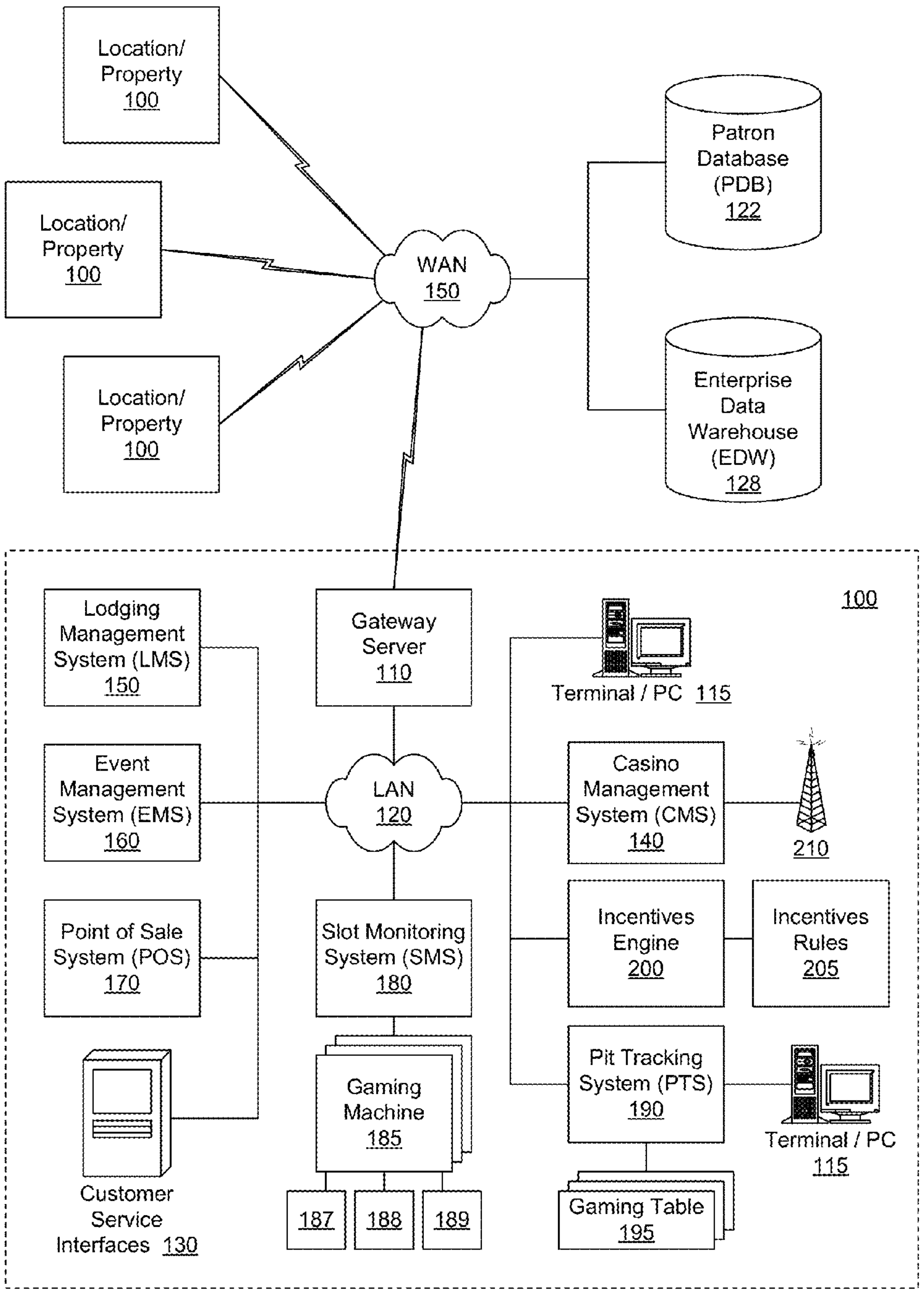
FIG. 7 is a schematic diagram of a casino system including a gaming machine running a skill based video game, in accordance with an embodiment of the invention.

FIG. 7 is a schematic diagram of a casino system including a gaming machine running a skill based video game, in accordance with an embodiment of the invention. In one embodiment in which a casino enterprise includes a number of casino properties 100, each property 100 preferably includes a gateway server 110 for coupling a local network 120 (such as a LAN) at the property 100 to a wide area network (WAN) 150. This allows multiple properties 100 to share and exchange data. In addition, the property 100 preferably includes one or more local operator terminals 115 (such as a PC or a dumb terminal) coupled to the LAN 120, allowing the casino personnel to access the system from the property 100. Having an operator terminal 115 at each property 100 allows local casino employees to manage the casino management system 140 at the property level, in real-time, and in response to player or casino needs.

In one embodiment, the gateway server 110 includes an API for sending data pertaining to local player activity over the WAN 150 to other properties or to a central data warehouse, such as the enterprise data warehouse (EDW) 128 and a patron database 122. The gateway server 110 communicates with several computer systems for monitoring and tracking operations at the particular property 100.

The PDB 122 provides the system with data regarding individual patrons, or patrons in a casino context. The PDB 122 preferably includes patron accounts (i.e., casino accounts, including casino reward programs) for patrons from all of the supported enterprise properties 100. The PDB 122 can be a centralized database or a distributed or federated database with segments of the database located at various properties 100. In one embodiment, each patron account in the PDB 122 includes detailed information such as the patron's personal information, preferences, interests, gaming and lodging history, credit rating, comp level, customer value measures, and accumulated credits. A patron's customer value is a measure of the patron's value to the casino based on the patron's betting activity, and optionally based on other activities of the patron from which the casino derives revenue or value. In one embodiment, the customer value measure is a theoretical win value is determined according to the patron's betting activity accumulated at any of the properties affiliated with the enterprise. Credits may be determined according to patron betting activity, but they may also be augmented by other types of activities as well and by special offers and various other promotional programs. These other activities include but are not limited to making a reservation, staying in a hotel, purchasing an item in a retail environment, eating at a restaurant, and attending a show or other events. In another aspect of an embodiment, PDB 122 is coupled via the WAN 150 to the EDW 128 uploading patron activity information for further analysis.

In one embodiment, patrons are issued tracking cards to interface with the system and thereby allow for tracking of their activities and identification of the patrons at locations in the casino such as gaming machines 185. Each tracking card preferably includes a magnetic strip, microchip, or other mechanism for storing machine-readable data thereon. When a patron performs some activity at a property, the patron may use the tracking card to interface with the system. For example, in the case of magnetic strip cards, the patron inserts the card through into card reader (i.e., "card-in"). Specifically for tracking patron betting, a slot machine or other gaming machine 185 includes a magnetic stripe card reader (not shown), which is adapted to receive the patron tracking cards. The incorporation of card readers into gaming machines 185 is a standard practice and well known to those of skill in the art. In an alternate or additional method of tracking patron activity, the patron or enterprise personnel can manually enter a patron ID number into a terminal 115 coupled to the system.

Depending on the services offered at a property 100, any combination of the following systems might be used to gather patron activity data: a Casino Management System (CMS) 140, a Lodging Management System (LMS) 150, an Event Management System (EMS) 160, a Point of Sale System (POS) 170, a Slot Monitoring System (SMS) 180, and a Pit Tracking System (PTS) 190. U.S. Pat. No. 5,761,647, "National Customer Recognition System and Method," the contents of which are fully incorporated by reference herein, explains how a CMS 140, a LMS 150, an EMS 160, a POS 170, a SMS 180, and a PTS 190 are used to track patrons' gaming and non-gaming activity at a plurality of affiliated casino properties communicatively coupled by a WAN. One suitable system for managing some or all of these point-of-sale operations is the 9700 Hospitality Management System (HMS), offered by MICROS Systems, Inc. The 9700 HMS is specifically designed to handle high usage, multiple revenue center environments, and it enables flexibility in the development of custom point of sale applications.

The CMS 140 is responsible for overall management of the tracking of patron activity, and the determination of reward credits to be given to each patron based on such activity. The CMS 140 receives data describing a patron's activity from the various other systems, as further described below, makes the appropriate calculations for earned reward credits, and updates the patron's account in the PDB 122.

The SMS 180 comprises a computer system that monitors and tracks bets made by patrons at the various gaming machines 185 at the property 100. Gaming machines 185 may include slot machines, video poker machines, or the like. In a preferred embodiment, bet tracking is accomplished through a card reader 189 associated with a gaming machine 185. A patron inserts his tracking card in the card reader 189 to initiate bet tracking and removes it to terminate bet tracking. Preferably, a patron's betting activity at a gaming machine 185 is logged in real time in the SMS 180 so that the information is provided to the CMS 140 before the gaming session is terminated. Bet tracking data accumulated by the SMS 180 includes the identification of the games played, the amount of coin-in, the number of credits won, the number of credits played, the amount won or lost, and the time period that the patron played the game. U.S. Pat. No. 5,429,361, the contents of which are fully incorporated by reference herein, describes a system for tracking the betting activity of casino patrons at gaming machines. In one embodiment, the SMS 180 comprises the Slot Data System (SDS), a data collection system for slot accounting and patron tracking produced by Bally's Gaming and Systems.

In one embodiment, each of the gaming machines 185 includes or is coupled to a display system 187 and/or a printing system 188. The display system 187 communicates general play status information to a patron, such as coin-in, money won or lost, and information about reward credits earned. The display may also communicate service messages to the patron (e.g., that the patron's room or a dinner reservation is ready). This display preferably occurs in real time (e.g., the amount of coin-in counts down and then resets at the end or beginning or a gaming session), although the actual earning and posting of base credits to the patron's account occurs on CMS 140 after the patron removes his card from the card reader 189. The display 187 is further configured to receive data from the SMS 180.

In one embodiment, the CMS 140 includes or is coupled to a broadcasting system 210, such as an 802.11 transmitter, that enables a secure, wireless environment. In this way, offers can be delivered to patrons over a wireless LAN to properly equipped wireless devices held by the patrons, as described above.

The PTS 190 is used to track patron betting at gaming tables 195. Like gaming machines 185. The PTS 190 is supported on a computer system that transmits patron betting data to the CMS 140. In one embodiment, the PTS 190 uses card readers 189 associated with patrons' positions at the gaming tables 195 to track their betting activity. Alternatively, an employee of the enterprise, such as a pit boss, manually enters a patron's gaming data into the PTS 190. In one embodiment, data regarding betting activity include a patron's time at a gaming table 195 and the table's minimum bet. U.S. Pat. No. 5,613,912, the contents of which are fully incorporated by reference herein, describes a system for automatically tracking the betting activity of casino patrons at gaming tables. Alternatively, tracking of patron betting at gaming tables is provided via a terminal 115 located in the pit near the tables. A patron provides her patron tracking card to a casino employee (e.g., a pit boss) who swipes the tracking card through a card reader 189 at the terminal 115 to initiate the patron's session. The employee can then observe the patron's betting, and manually enter this information into the terminal 115, such as average amount bet, length of play, and so forth. U.S. Pat. No. 5,809,482, and U.S. Pat. No. 5,613,912, both incorporated by referenced herein, describes two different embodiment of a PTS 190 that may be used for tracking table play.

The LMS 150 comprises the software and hardware for managing hotel operations within the casino, including reservations, room service, and other activities associated with hotel operations. In a preferred embodiment, the LMS 150 communicates with the CMS 140 to search locally for selected customer information available on that system. However, LMS 150 may include its own local data store for patron data specific to the property 100. The LMS 150 transmits data regarding patrons' lodging activity to the PDB 120 when patrons check in and out of a hotel. In an embodiment, a patron's lodging data includes the dates that the patron stayed at a particular property and the type of rooms. This data may also be updated to a central PDB via the application server 102. In addition, the LMS 150 preferably transmits lodging data upon a request from the application server 102 (via the local gateway server 110). The lodging data includes, for example, the dates that a patron stays at a hotel, room service activity, and billing information due to the patron's stay in the hotel. In one embodiment, the LMS 150 comprises the Lodging Management System, a data management system for hospitality industries produced by Inter-American Data, Inc.

The EMS 160 comprises software for handling ticketing information, reservations, and sales. The EMS 160 compiles patron activity data when patrons purchase tickets for an event (such as a show at the property), make reservations for an event, and attend the event. The EMS 160 transmits this data to the application server 102 upon a request therefrom (via the local gateway server 110).

The POS 170 comprises accounting software for operating restaurants and retail venues within the property as well as software for transmitting charge information to the other management systems. For example, data relating to meals charged to rooms are transmitted from the POS 170 to the LMS 150, and data relating to redeemed meal comps are transmitted from the POS 170 to the CMS 140. The gateway server 110 receives data relating to patron's purchases at a property from the POS 170 and transmits the data to the application server 102. This purchasing data includes, in an embodiment, the items or services purchased, the restaurant or retail venue where purchased, and the purchase amounts.

The property 100 preferably includes one or more customer service interfaces (CSI) 130. In one embodiment, a customer service interface 130 comprises a computer having an output display and a user input, such as a card reader 189 and a touch. Patrons can access information for their account with a customer service interface 130, e.g., by swiping their cards through the card reader 189. The customer service interface 130 may be housed in a kiosk or other user accessible housing. In one embodiment, the CSI 130 receives patron data by way of their tracking cards swiped at customer service interfaces 130 located at various venues throughout the property 100. The CSI 130 transmits the received data to the PDB 120 to determine the identity of the patron and any required data in the patron's account (such as name, address, and any preferred customer status). In particular, the CSI 130 enables customers to view the reward credit balance, and to issue themselves redeemable "comp" tickets or cash voucher according to a provided menu of comps and their associated number of credits.

Data related to each patron's activity at a property 100, as collected by any of the management systems described herein, are communicated to the CMS 140, for analysis and determination of appropriate reward credits. The CMS 140 updates the PDB 122 with the results of such analyses, including updating a patron's account by incrementing (or decrementing) the patron's reward credit balance. Because each property 100 tracks patron betting activity, awards reward credits and/or other incentives based on such activity, and updates the PDB 122, the enterprise can reward patrons based on their overall betting (and other activity) at all of the casino properties. This cross-property nature of the system, in combination with the fixed and variable credit rate schedules, enables the enterprise to adjust the difficulty of a casino game based on their overall worth to the enterprise and/or from their overall betting activity, while also allowing individual properties 100 to reward the patron based on property-specific factors or rules. To maintain all account data up to date, the data processed by the local management systems are periodically updated to central PDB 122, e.g., in a batch process. In one embodiment, this update synchronizes data between multiple storage properties (i.e., PDB 122 and local stores associated with the CMS 140 at each property 100) to enable enterprise personnel at any property 100 to access the most recent and accurate data. When this configuration is employed with a WAN 150 having limited bandwidth, the data synchronization is preferably done when traffic on WAN 150 is low to minimize interference with other on-line data access transmissions.

The CMS 140 is responsible for receiving patron betting data from the SMS 180 and the PTS 190 and updating the PDB 122 with this information.

Any button which appears as a virtual button on the of the gaming machine 185 may also be additionally or alternatively implemented as a physical button on the gaming machine 185.

The present invention has been described in particular detail with respect to various embodiments, and those of skill in the art will appreciate that the invention may be practiced in other embodiments. In addition, those of skill in the art will appreciate the following aspects of the disclosure. First, the particular naming of the components, capitalization of terms, the attributes, data structures, or any other programming or structural aspect is not mandatory or significant, and the mechanisms that implement the invention or its features may have different names, formats, or protocols. Second, the named systems may be implemented via a combination of hardware and software, as described, or entirely in hardware elements. Third, the particular division of functionality between the various systems described herein is merely exemplary, and not mandatory; functions performed by one system may instead be performed by other systems, and functions performed in a single system may instead be performed by several different systems.

Some portions of above description describe the invention in terms of algorithms and symbolic representations of operations on information. These algorithmic descriptions and representations are the means used by those skilled in the data processing arts to most effectively convey the substance of their work to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as systems, without loss of generality. The described operations and their associated systems may be embodied in software, firmware or hardware.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

The features and advantages described in this summary and the following detailed description are not all-inclusive. Many additional features and advantages will be apparent to one of ordinary skill in the art in view of the drawings, specification, and claims hereof.

The invention claimed is:

1. A method for implementing a virtual card game within a gaming machine, comprising:
- receiving a bet from a player;
- determining a shot count based on the bet;
- randomly selecting a card to enter gameplay;
- displaying the card on a display of the gaming machine, the display of the card comprising moving the card along a path on the display for a limited period of time during which the player can attempt to select the card, such that after the expiration of the time period the card cannot be selected by the player;
- receiving a shot input at the gaming machine during the limited time period, the shot input comprising a shot location on the display, the shot input occurring responsive to the player pointing a pointing device at the shot location on the display and activating a game trigger on the pointing device;
- responsive to the shot location matching a current location of the card on the display, adding the card to a player hand; and
- reducing the player shot count.

2. The method of claim 1, wherein the shot count decreases as an amount of the bet increases.

3. The method of claim 1, wherein the card selected to enter gameplay is based on an amount of the bet.

4. The method of claim 1, wherein moving the card along the path on the display comprises a motion behavior comprising at least one of: a start point, an end point, a velocity of travel, a display duration, a rotation behavior, a card size, and a flip behavior.

5. The method of claim 4, wherein the motion behavior is based on an amount of the bet.

6. The method of claim 1, wherein determining that the shot location matches a current location of the card on the display comprises determining whether the shot location falls within a border of the edge of the displayed card.

7. The method of claim 1, comprising
- determining that the shot location matches a current location of a held card in the player hand; and
- removing the held card from the player hand.

8. The method of claim 1, comprising adding a free card to the player hand after the bet is received.

9. The method of claim 1, comprising
- determining that the player hand matches a win condition in a pay table; and
- increasing a player credit total based on the matching win condition and an amount of the bet.

10. A method for implementing a virtual tile game within a gaming machine, comprising:
- receiving a bet from a player;
- selecting a plurality of bonus tiles to enter gameplay, each of the bonus tiles having a bonus symbol on at least one face;
- constructing a tile structure comprising a plurality of tiles, each tile having a symbol on at least one face, the tile structure including the bonus tiles;
- displaying the tile structure on a display of the gaming machine and beginning gameplay by decrementing a game time over time;
- rotating the displayed tile structure in one or more dimensions based on a received rotation input;
- receiving a first and second tile selection at the gaming machine;
- determining that the first and second tile selections are valid;
- responsive to a first symbol of the first tile and a second symbol of the second tile matching, removing the first and second tiles from the tile structure; and
- increasing a player credit total if the removed tiles are bonus tiles.

11. The method of claim 10, wherein the number of bonus tiles increases as an amount of the bet increases.

12. The method of claim 10, wherein the bonus tiles comprises at least four bonus tiles, the bonus tiles comprising a first plurality of bonus tiles, each of the first bonus tiles having a first bonus symbol on at least one face, and a second plurality of bonus tiles, each of the second bonus tiles having a second bonus symbol on at least one face.

13. The method of claim 10, wherein a number of bonus symbols assigned to bonus tiles increases as an amount of the bet increases.

14. The method of claim 10, wherein constructing a tile structure comprises organizing the tiles in a structure.

15. The method of claim 14, wherein the structure is a cube.

16. The method of claim 15, wherein the structure is a plurality of layers of tiles wherein each layer includes a different number of tiles.

17. The method of claim 10, wherein each symbol is applied to tiles in multiples of two tiles.

18. The method of claim 10, wherein each symbol is applied to tiles in multiples of three.

19. The method of claim 10, wherein determining that the tile selection is valid comprises determining that there are no tiles on at least one of the left or the right of the tile selection.

20. The method of claim 10, comprising increasing a game time if the removed tiles are time extension tiles.

21. A gaming machine configured to implement a virtual card game, comprising:
- a processor configured to execute programming instructions; and
- a non-transitory computer-readable storage medium storing the programming instructions, the programming instructions configured to:
  - receive a bet from a player;
  - determine a shot count based on the bet;
  - randomly select a card to enter gameplay;
  - display the card on a display of the gaming machine, the display of the card comprising moving the card along a path on the display for a limited period of time during which the player can attempt to select the card, such that after the expiration of the time period the card cannot be selected by the player;

receive a shot input at the gaming machine during the limited time period, the shot input comprising a shot location on the display, the shot input occurring responsive to the player pointing a pointing device at the shot location on the display and activating a game trigger on the pointing device;

responsive to the shot location matching a current location of the card on the display, add the card to a player hand; and reduce the player shot count.

22. A gaming machine configured to implement a virtual tile game, comprising:

a processor configured to execute programming instructions; and a non-transitory computer-readable storage medium storing the programming instructions, the programming instructions configured to:

receive a bet from a player;

select a plurality of bonus tiles to enter gameplay, each of the bonus tiles having a bonus symbol on at least one face;

construct a tile structure comprising a plurality of tiles, each tile having a symbol on at least one face, the tile structure including the bonus tiles;

display the tile structure on a display of the gaming machine and beginning gameplay by decrementing a game time over time;

rotate the displayed tile structure in one or more dimensions based on a received rotation input;

receive a first and second tile selection at the gaming machine;

determine that the first and second tile selections are valid;

responsive to a first symbol of the first tile and a second symbol of the second tile matching, remove the first and second tiles from the tile structure; and increase a player credit total if the removed tiles are bonus tiles.

* * * * *